United States Patent [19]
Jeong

[11] Patent Number: 5,918,060
[45] Date of Patent: Jun. 29, 1999

[54] MONITOR POWER SUPPLY ADJUSTING CIRCUIT FOR COMPUTER SYSTEM

[75] Inventor: Seok Hwa Jeong, Kyoungsangbuk-Do, Rep. of Korea

[73] Assignee: LG Electronics Inc., Seoul, Rep. of Korea

[21] Appl. No.: 08/778,092

[22] Filed: Jan. 2, 1997

[30] Foreign Application Priority Data

Mar. 8, 1996 [KR] Rep. of Korea ............... P96-6147

[51] Int. Cl.⁶ .................................................. G06F 1/32
[52] U.S. Cl. .......................... 395/750.06; 395/750.03
[58] Field of Search ........................ 345/750.01–750.08

[56] References Cited

U.S. PATENT DOCUMENTS 5,396,443  3/1995  Mese et al. ........................ 364/707
5,449,984  9/1995  Sawdon et al. ..................... 315/386

FOREIGN PATENT DOCUMENTS 622721     11/1994  European Pat. Off. .
258074      1/1993  United Kingdom .
WO95 04319  2/1995  WIPO .

*Primary Examiner*—Ayaz R. Sheikh
*Assistant Examiner*—David A. Wiley
*Attorney, Agent, or Firm*—Christie, Parker & Hale, LLP

[57] ABSTRACT

A monitor power supply adjusting circuit for providing/blocking the supply of the supply voltage to a monitor depending on whether the temperature of a user is detected, preventing waste of power consumption and deterioration of the product caused by an excessive supply of the power supply voltage.

2 Claims, 4 Drawing Sheets

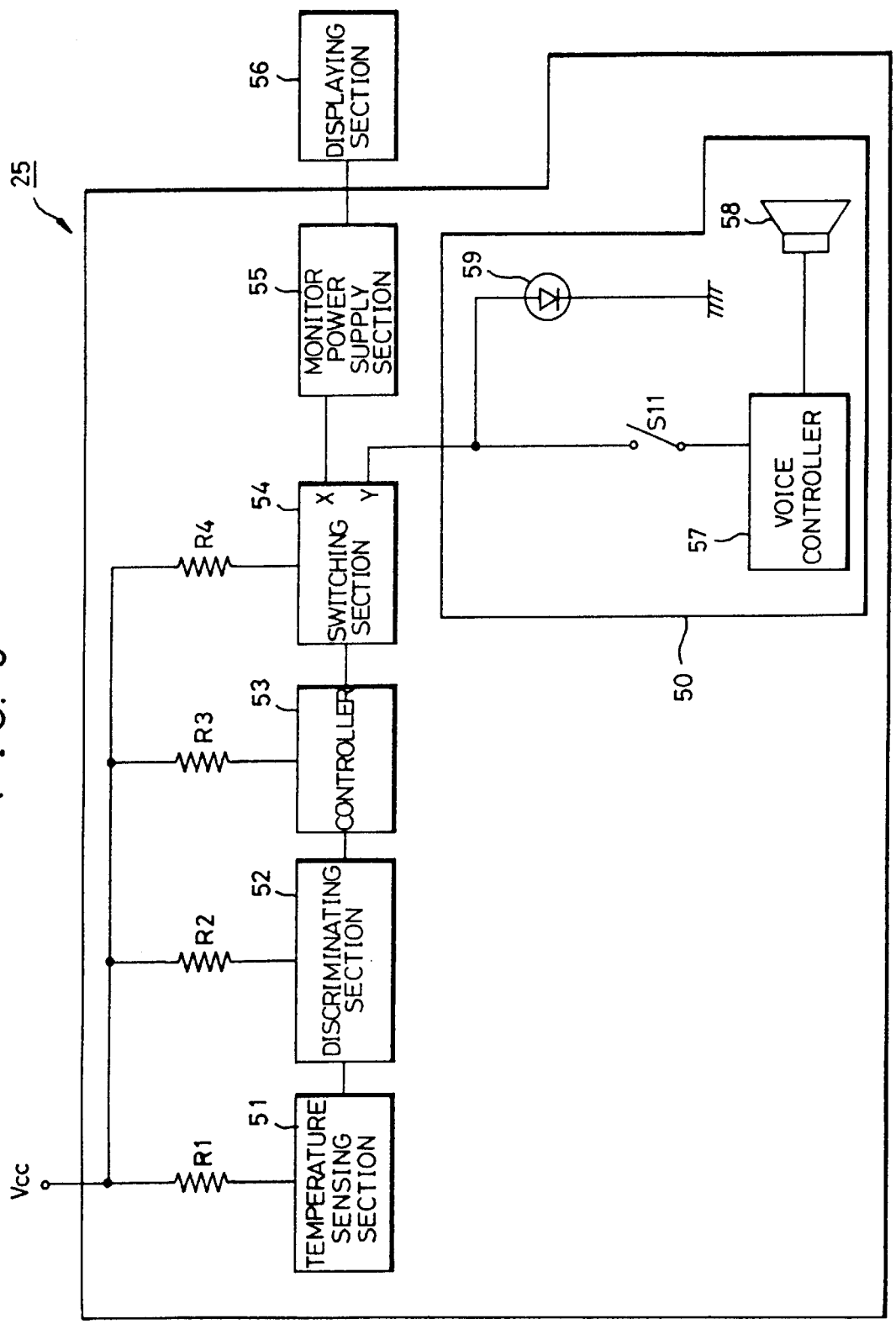

FIG. 4

| LEVEL | RANGE | OUTPUT |
|---|---|---|
| 1 | M = 36°C ± X | HIGH |
| 2 | K > M, K < M | LOW |

MONITOR POWER SUPPLY ADJUSTING CIRCUIT FOR COMPUTER SYSTEM

BACKGROUND OF THE INVENTION

1. Field of the Invention

The present invention relates to a monitor power supply adjusting circuit for a computer system, and more particularly a monitor power supply adjusting circuit which can automatically control the power supply voltage to the monitor by detecting a monitor user's temperature.

2. Prior Art

There are two methods for controlling a power supply voltage for a computer system. One is to independently supply the power to each of the monitor and the computer main body as shown in FIG. 1A and the other is to supply the power to the computer main body which is then supplied to the monitor as shown in FIG. 1B.

In FIG. 1A, the power supply voltage passing through a socket 5 is supplied to a monitor 9 by turning "on" switch S1. The power supply voltage is supplied to a computer main body 13, which is connected to the monitor 9 by a signal cable 11, through a socket 7 and a switch S2. That is, a furnishment of the power supply voltage to the monitor 9 and the computer main body 13 is controlled by "on/off" operation of the switches S1 and S2, respectively.

In FIG. 1B, the power supply voltage passing through a socket 15 is provided to a computer main body 23 by turning "on" switch S3. Since the computer main body 23 is connected to the monitor 23 by a signal cable 19 and a power supply voltage line 21, the power supply voltage which is provided to the computer main body 23 also provided to the monitor 17. That is, if only the power supply voltage to the computer main body is furnished, then, the power supply voltage is always supplied to the monitor 17, which is controlled by only "on/off" operation of the switch S3.

If the power supply voltage is continuously supplied to the monitor and the computer main body when a user leaves his place before the computer system or the monitor for a given time, the computer system may overheat due to unnecessarily excessive power supply voltage, subjecting the system to possible damage, while also consuming excessive power. Also, in order to block the supply of the power supply voltage to the monitor, the switch S1 or S3 needs to be manually turned off. In addition, in case where the power supply voltage to the monitor in FIG. 1B is blocked, the supply voltage to the computer main body is blocked, resulting in the loss of information stored in the computer main body.

SUMMARY OF THE INVENTION

Accordingly, an object of the present invention is to provide a monitor power supply adjusting circuit for a computer system which solves the above mentioned problems.

Another object of the present invention is to provide a computer system having a circuit for suitably controlling a power supply voltage to a monitor installed within the computer system.

According to one aspect of the present invention, there is provided a monitor power supply adjusting circuit for providing/blocking the supply of the supply voltage to a monitor depending on whether the temperature of the computer system or the monitor user is detected. The circuit has: means for sensing a temperature of a monitor user; means for recognizing the sensed temperature and discriminating a range of said temperature; means for determining a power supply mode of said computer system in accordance with the result of said discriminating means; means for normally driving said monitor of said computer system when said computer system is in a normal mode according to the result of said determining means; and means for informing said user that said monitor of said computer system is in a power saving mode when said computer system is in said power saving mode according to the result of said determining means.

According to another aspect of the present invention, there is provided a computer system comprising: a monitor; means for receiving a power supply voltage and controlling a supply/block of said power supply voltage to said monitor in response to a detected temperature of a user using said monitor; and a computer main body receiving said supply voltage and connected to said monitor through a signal cable.

According to still another aspect of the present invention, there is provided a computer system comprising: a computer main body receiving a given power supply voltage; a monitor connected to said computer main body through a signal cable; and means, coupled between said computer main body and said monitor, for controlling a supply/block of said power supply voltage to said monitor in response to a detected temperature of a user using said monitor.

BRIEF DESCRIPTION OF THE DRAWINGS

The advantages and object of the present invention will become apparent by explaining the preferred embodiments of the present invention referring to the attached drawings, in which:

FIG. 3 is a schematic circuit diagram of the monitor power supply adjusting circuit shown in FIG. 2A.

FIG. 4 is a table explaining an operation of a temperature discriminating section in FIG. 3.

DETAILED DESCRIPTION OF THE PREFERRED EMBODIMENTS

Figure 1A:
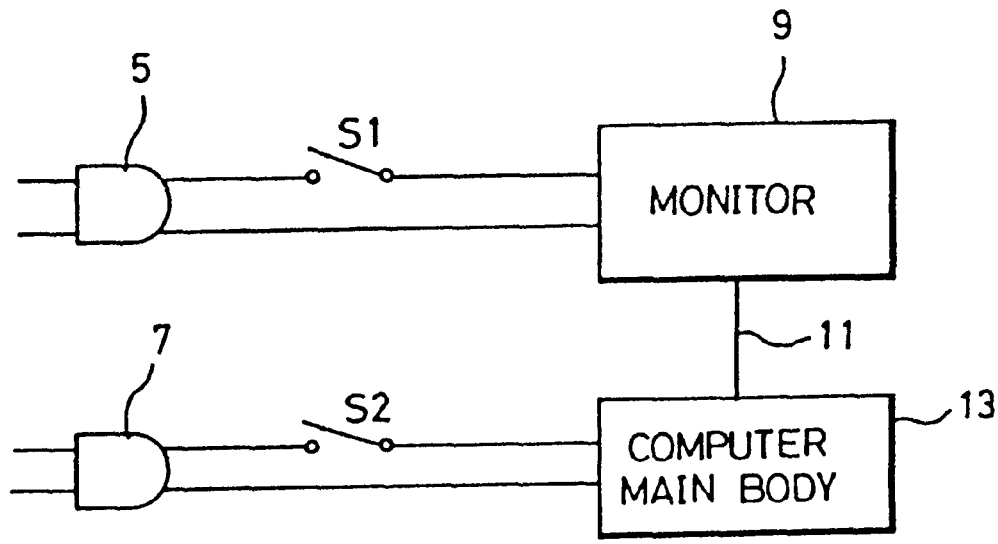
FIGS. 1A and 1B show a computer system having a monitor power supply adjusting circuit according to a conventional art.
Figure 1B:
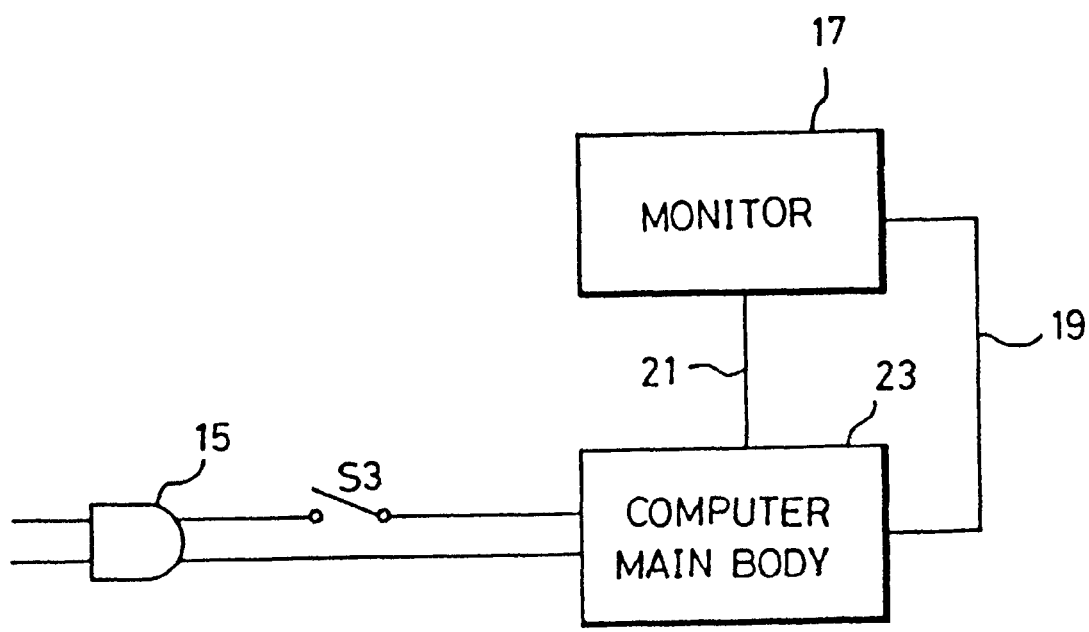
Figure 2A:
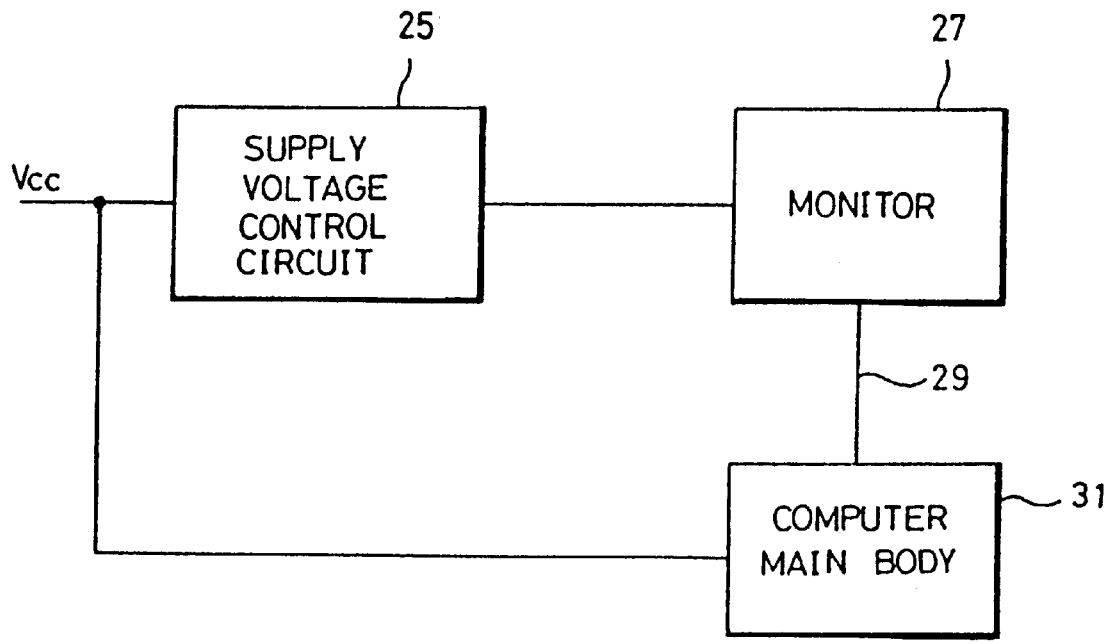
FIGS. 2A and 2B show a computer system having a monitor power supply adjusting circuit according to a present invention.

FIG. 2A illustrates one preferred embodiment of a computer system in accordance with the present invention. A supply voltage Vcc is directly supplied to a computer main body 31. A supply of the supply voltage Vcc to a monitor 27 is made through a power supply adjusting circuit 25. The power supply adjusting circuit 25 blocks the supply voltage Vcc when a user of the computer system or the monitor leaves his place. Information of the computer main body 31 is transferred to the monitor 27 through a signal cable 29.

As another embodiment, the power supply adjusting circuit 25 can be installed in the monitor 27 or the computer main body 31.

Figure 2B:
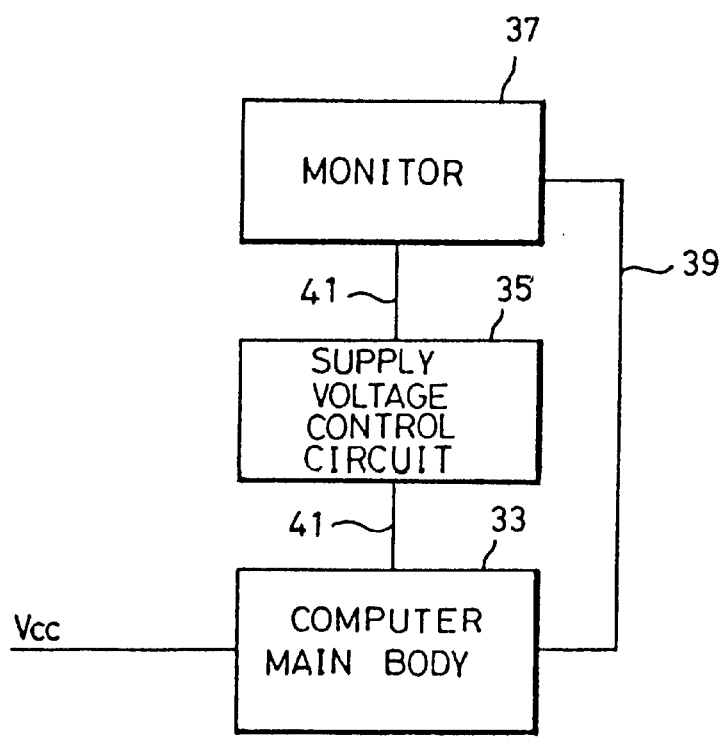

FIG. 2B illustrates another preferred embodiment of a computer system in accordance with the present invention. The supply voltage Vcc is supplied to a computer main body 33. Information of the computer main body 33 is carried to a monitor 37 through a signal cable 39. A power supply adjusting circuit 35 is coupled between the computer main body 33 and the monitor 37, so that the supply of the supply voltage Vcc outputted from the computer main body 33 to the monitor 37 is blocked when the user of the computer system or the monitor leaves his place, and otherwise the supply voltage is provided to the monitor 37 through the power supply adjusting circuit 35.

FIG. 3 is a detail of the power supply adjusting circuit 25 in FIG. 2A and the structure of the power supply adjusting circuit in FIG. 2B can be equal or similar to that in FIG. 2A.

The power supply adjusting circuit 25 includes a temperature sensing section 51, connected to the supply voltage Vcc through a resistor R1, for sensing a temperature of a user; a discriminating section 52 connected to the temperature sensing section 51 and securing the supply voltage Vcc through a resistor R2; a power saving time controller 53 connected to the discriminating section 52 and securing the supply voltage Vcc through a resistor R3; a switching section 54 connected to the power saving time controller 53 and securing the supply voltage Vcc through a resistor R4; a monitor power supply section 55, connected to a normal mode terminal of the switching section 54, for providing the supply voltage so as to normally drive the monitor; and a display circuit 50, connected to a power saving mode terminal of the switching section 54, for informing the user or third party that the computer system is in the power saving mode. The display circuit 50 is composed of a voice controller 57 connected to the power saving mode terminal Y through a switch S11, a speaker 58 connected to the voice controller 57 and a radiating section 59 coupled between the power saving mode terminal Y and a ground terminal. In normal mode, information transferred from the computer main body is displayed on a displaying section 56 of the monitor upon the supply voltage to the monitor power supply section 55. The resistors R1 through R4 are used for biasing the supply voltage.

Figure 4:
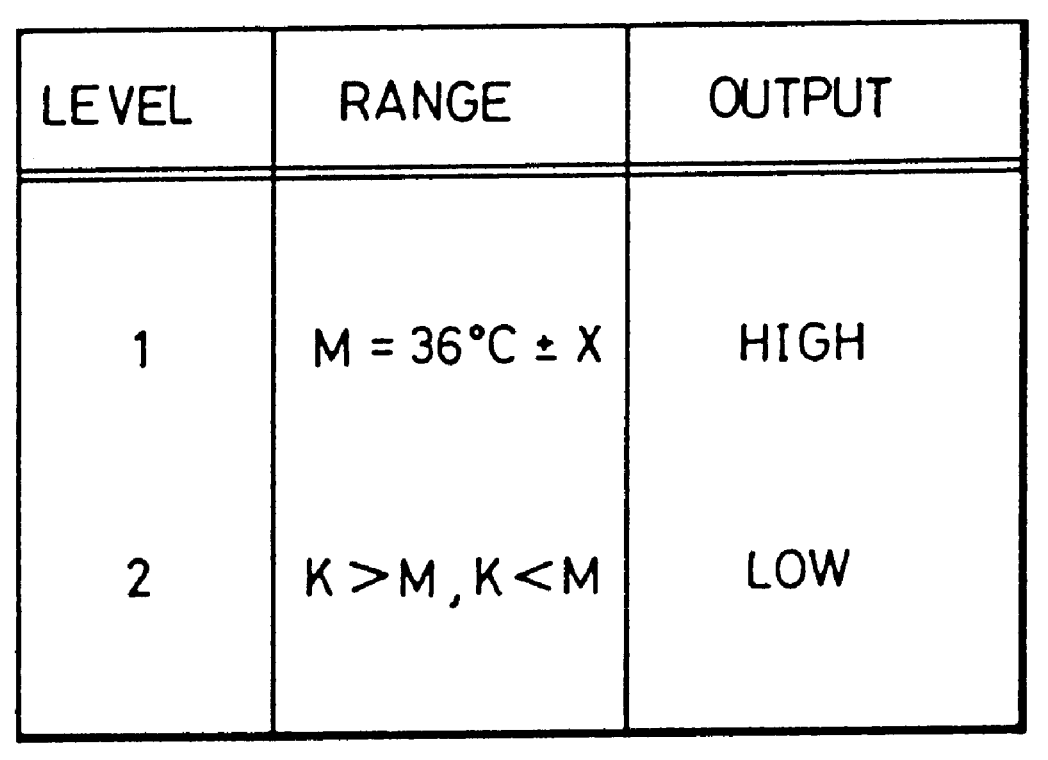

Referring to FIG. 4, an operation of the above mentioned embodiment will be explained. The temperature sensing section 51, by radiating infrared ray, detects the existence of a living being and the temperature of the living being, which have different temperatures according to the kind of the living being (human or animal). The sensed temperature is transferred to the discriminating section 52 and then it checks whether or not the user is in front of the computer system or the monitor and if in front, whether the user is a human being. The checking method is shown in a table of FIG. 4. If the sensed temperature is in 36° C.±$\chi$ (here $\chi$ is tolerance), we can recognize that a human is using the computer system or the monitor (first case). Otherwise, either an animal except human is before the computer system or the monitor or there is no creature before the computer system or the monitor (second case). Included in the latter case would be instance where the user is before the computer system or the monitor but the temperature detection is prevented by an obstacle between the user and the computer system or the monitor. In the first case, the discriminating section 52 produces signal of logic "high" and in the second case the discriminating section 52 produces signal of logic "low". If the signal of logic "high" is generated, the switching section 54 receives an on-control signal from the controller 53 so that the computer system is operated in normal mode. Then, the switching section 54 is switched to the normal mode terminal X thereof in order to normally drive the monitor of the computer system in response to the on-control signal. The supply voltage Vcc is outputted to the normal mode terminal X of the switching section 54 through the resistor R4 and then is supplied to the monitor power supply section 55. Accordingly, information of the computer main body is displayed on the displaying section 56 in the monitor. On the other hand, in case where the output signal of the discriminating section 52 is logic "low", since it is preset in the power saving time controller 53 to turn off the monitor of the computer system after a given time during which the user is not before the computer system or the monitor, if the power saving time controller 53 continuously receives the logic "low" signal beyond the given time, the power saving time controller 53 produces an off-control signal. Thereafter, the switching section 54 is switched to the power saving mode terminal Y thereof according to the off-control signal in order to drive the monitor of the computer system in power saving mode. Accordingly, the supply voltage Vcc provided to the monitor by the off-control signal is blocked and the supply voltage through the resistor R4 is delivered to the radiating section 59 via the power saving mode terminal Y, so that it is visually informed that the computer system is in power saving mode. If the switch S11 is turned on, the supply voltage Vcc is supplied to the voice controller 57 through the switching section 54, outputting outwardly sound or melody representing the power saving mode through the speaker 58. So as to stop the output of the voice controller 57, the switch S11 must be "off".

If the user who is not in front of the computer system or the monitor returns to his place, the temperature sensing section 51 senses the temperature of the user and the discriminating section 52 produces logic "high" signal, driving the monitor of the computer system in normal mode.

As described above, by utilizing instances where the user is not in front of the computer system or the monitor and the user's temperature is not detected, the monitor of the computer system is automatically modified in power saving mode, and if the user returns to his place, the monitor is operated in normal mode by sensing the temperature of the user. Accordingly, the present invention can prevent the waste of power consumption and the deterioration of the product caused by the excessive supply of the supply voltage.

What is claimed is:

1. A monitor power supply adjusting circuit for a computer system having a monitor, said circuit comprising:

means for sensing a temperature of a monitor user;

means for discriminating a range of said sensed temperature;

means for determining a power supply mode of said computer system in accordance with a result of said discriminating means, said power supply mode comprising a normal mode when the sensed temperature is in the discriminated range and a power saving mode when the sensed temperature is outside the discriminated range, said discriminated range being defined by an equation M=36° C.±X, where M is the sensed temperature and X is a tolerance;

monitor power supply section;

a display circuit comprising means for informing said user that said monitor of said computer system is in said power saving mode when said computer system is in said power saving mode; and a switching circuit having a first output connected to the monitor power supply for applying power to the monitor power supply when the power supply mode is in the normal mode and removing power from the monitor power supply when the power supply mode is in the power saving mode, and a second output connected to the display circuit for applying power to the display circuit when the power supply mode is in the power saving mode and removing power from the display circuit when the power supply mode is in the normal mode.

2. A circuit as claimed in claim 1, wherein said informing means comprises:

a radiating section for visually indicating said power saving mode;

a switch for being switched on or off to selectively show said power saving mode in audio form;

a controller for controlling voice information according to said power saving mode, in response to an operation of said switch; and a speaker, connected to said controller, for outwardly producing said voice information so as for said user to identify a state of said computer system.

* * * * *